United States Patent
Cox (10) Patent No.: US 9,961,385 B2
(45) Date of Patent: *May 1, 2018

(54) NEWS PRODUCTION SYSTEM WITH PROGRAM SCHEDULE MODIFICATION FEATURE

(71) Applicant: Tribune Broadcasting Company, LLC, Chicago, IL (US)

(72) Inventor: Gary Wilson Cox, Sacramento, CA (US)

(73) Assignee: Tribune Broadcasting Company, LLC, Chicago, IL (US)

(*) Notice: Subject to any disclaimer, the term of this patent is extended or adjusted under 35 U.S.C. 154(b) by 0 days. days.

This patent is subject to a terminal disclaimer.

(21) Appl. No.: 14/809,656

(22) Filed: Jul. 27, 2015

(65) Prior Publication Data

US 2017/0034555 A1 Feb. 2, 2017

(51) Int. Cl.
| | |
|---|---|
| H04N 5/445 | (2011.01) |
| H04N 21/262 | (2011.01) |
| H04N 21/236 | (2011.01) |
| H04N 21/81 | (2011.01) |
| H04N 5/272 | (2006.01) |
| H04N 21/258 | (2011.01) |

(Continued)

(52) U.S. Cl.
CPC ........... *H04N 21/262* (2013.01); *G06Q 50/01* (2013.01); *H04N 5/272* (2013.01); *H04N 21/236* (2013.01); *H04N 21/25891* (2013.01); *H04N 21/2668* (2013.01); *H04N 21/4758* (2013.01); *H04N 21/8126* (2013.01); *H04N 21/8153* (2013.01)

(58) Field of Classification Search
CPC ........................ H04N 5/272; H04N 21/8153
See application file for complete search history.

(56) References Cited

U.S. PATENT DOCUMENTS 6,268,849 B1 * 7/2001 Boyer ............... G06F 17/30855
348/E7.071
6,460,018 B1 * 10/2002 Kasai ............... G06Q 10/06314
348/155

(Continued)

FOREIGN PATENT DOCUMENTS

JP 2005333279 A 12/2005

OTHER PUBLICATIONS

International Search Report dated Oct. 27, 2016 issued in connection with International Application No. PCT/US2016/43398 filed Jul. 21, 2016, 3 pages.

(Continued)

*Primary Examiner* — James R Sheleheda
(74) *Attorney, Agent, or Firm* — McDonnell Boehnen Hulbert & Berghoff LLP (57) ABSTRACT

In one aspect, an example method involves: accessing, by a computing device, a program schedule of a news program; accessing, by the computing device, data associated with an election; using, by the computing device, the accessed data to make a determination that a status of the election satisfies each condition in a condition set; responsive to making the determination that the status of the election satisfies each condition in the condition set, modifying, by the computing device, the program schedule at least by inserting into the program schedule a record that corresponds to the election; and displaying, by the computing device, the modified program schedule.

20 Claims, 7 Drawing Sheets

(51) Int. Cl.
  *H04N 21/2668* (2011.01)
  *G06Q 50/00* (2012.01)
  *H04N 21/475* (2011.01)

(56) References Cited

U.S. PATENT DOCUMENTS

| | | | | |
|---|---|---|---|---|
| 6,760,916 | B2 * | 7/2004 | Holtz | G06Q 30/06 |
| | | | | 348/E5.022 |
| 6,941,515 | B1 * | 9/2005 | Wilkins | G06T 11/60 |
| | | | | 715/717 |
| 6,952,221 | B1 * | 10/2005 | Holtz | G11B 27/034 |
| | | | | 715/719 |
| 7,835,920 | B2 * | 11/2010 | Snyder | G06F 3/0481 |
| | | | | 705/1.1 |
| 9,049,386 | B1 * | 6/2015 | Hundemer | H04N 21/23412 |
| 9,264,752 | B1 * | 2/2016 | Hundemer | H04N 21/26258 |
| 9,554,173 | B1 * | 1/2017 | Hundemer | H04N 21/26258 |
| 9,674,464 | B2 * | 6/2017 | Cox | H04N 5/272 |
| 2002/0053078 | A1 * | 5/2002 | Holtz | G06Q 30/06 |
| | | | | 725/14 |
| 2002/0054244 | A1 * | 5/2002 | Holtz | G06F 3/0481 |
| | | | | 348/722 |
| 2003/0001880 | A1 * | 1/2003 | Holtz | G06F 17/30017 |
| | | | | 715/716 |
| 2003/0196198 | A1 | 10/2003 | Broussard et al. | |
| 2004/0008220 | A1 * | 1/2004 | Snyder | G06F 3/0481 |
| | | | | 715/716 |
| 2007/0223506 | A1 | 9/2007 | Nakagawa et al. | |
| 2007/0242082 | A1 * | 10/2007 | Lathrop | G06F 17/30271 |
| | | | | 345/619 |
| 2010/0223642 | A1 | 9/2010 | Knudson et al. | |
| 2011/0314144 | A1 * | 12/2011 | Goodman | G06Q 10/06 |
| | | | | 709/224 |
| 2012/0117597 | A1 | 5/2012 | Tomioka | |
| 2012/0230195 | A1 * | 9/2012 | Khivesara | H04L 12/1881 |
| | | | | 370/235 |
| 2012/0291067 | A1 * | 11/2012 | Wiles | H04H 60/06 |
| | | | | 725/35 |
| 2013/0159295 | A1 * | 6/2013 | Gross | G06F 17/30867 |
| | | | | 707/724 |
| 2013/0174026 | A1 * | 7/2013 | Locke | G06Q 10/10 |
| | | | | 715/254 |
| 2014/0316911 | A1 * | 10/2014 | Gross | G06F 17/30867 |
| | | | | 705/14.73 |
| 2015/0007244 | A1 * | 1/2015 | Colby | H04N 5/782 |
| | | | | 725/116 |
| 2015/0255056 | A1 * | 9/2015 | Panguluri | G10L 13/00 |
| | | | | 704/260 |
| 2015/0294025 | A1 * | 10/2015 | Wellen | G06F 17/20 |
| | | | | 715/202 |
| 2015/0296258 | A1 * | 10/2015 | Morten | H04N 21/458 |
| | | | | 725/31 |
| 2015/0358661 | A1 * | 12/2015 | Navarro | H04N 21/2668 |
| | | | | 725/59 |
| 2015/0365725 | A1 * | 12/2015 | Belyaev | H04N 21/458 |
| | | | | 725/46 |
| 2015/0371679 | A1 * | 12/2015 | Oz | G11B 27/031 |
| | | | | 386/241 |
| 2016/0005436 | A1 * | 1/2016 | Axen | G11B 27/031 |
| | | | | 386/240 |
| 2016/0014482 | A1 * | 1/2016 | Chen | G11B 27/031 |
| | | | | 386/241 |
| 2016/0112737 | A1 * | 4/2016 | Johnston | H04N 21/44204 |
| | | | | 725/14 |
| 2016/0118082 | A1 * | 4/2016 | Holtz | H04N 5/262 |
| | | | | 386/278 |
| 2016/0306857 | A1 * | 10/2016 | Barsness | G06F 17/30442 |
| 2016/0357770 | A1 * | 12/2016 | Wu | G06F 7/08 |
| 2016/0359791 | A1 * | 12/2016 | Zhang | H04L 51/32 |
| 2017/0032822 | A1 * | 2/2017 | Axen | G11B 27/031 |
| 2017/0034452 | A1 * | 2/2017 | Cox | H04N 5/272 |
| 2017/0178687 | A1 * | 6/2017 | Tamir | G11B 27/036 |
| 2017/0230588 | A1 * | 8/2017 | Cox | H04N 5/272 |

OTHER PUBLICATIONS

The International Search Report (ISR) with Written Opinion of the International Searching Authority for PCT/US2016/043398 dated Oct. 27, 2016.

* cited by examiner

| Story Title | Video-Segment Identifier | Duration | DVE Identifier |
|---|---|---|---|
| STORY A | VS ID A | 00:02:00:00 | DVE ID A |
| STORY B | VS ID B | 00:01:30:00 | |
| STORY C | | 00:00:30:00 | DVE ID C |
| STORY D | VS ID D | 00:00:30:00 | |
| STORY E | VS ID E | 00:00:30:00 | |
| COMMERCIAL BREAK | | | |
| STORY F | VS ID F | 00:02:00:00 | DVE ID F |
| STORY G | | 00:01:30:00 | DVE ID G |
| STORY H | VS ID H | 00:00:30:00 | |
| STORY I | VS ID I | 00:00:30:00 | |

Figure 5A

| Story Title | Video-Segment Identifier | Duration | DVE Identifier |
|---|---|---|---|
| STORY A | VS ID A | 00:02:00:00 | DVE ID A |
| STORY B | VS ID B | 00:01:30:00 | |
| STORY C | | 00:00:30:00 | DVE ID C |
| STORY D | VS ID D | 00:00:30:00 | |
| STORY E | VS ID E | 00:00:30:00 | |
| COMMERCIAL BREAK | | | |
| STORY F | VS ID F | 00:02:00:00 | DVE ID F |
| STORY G | | 00:01:30:00 | DVE ID G |
| STORY X | | 00:00:30:00 | DVE ID X |
| STORY H | VS ID H | 00:00:30:00 | |
| STORY I | VS ID I | 00:00:30:00 | |

NEWS PRODUCTION SYSTEM WITH PROGRAM SCHEDULE MODIFICATION FEATURE

USAGE AND TERMINOLOGY

In this disclosure, with respect to all reasonable derivatives of such terms, unless otherwise specified and/or unless the particular context clearly dictates otherwise, each usage of "a" or "an" means at least one, and each usage of "the" means the at least one.

BACKGROUND

Unless otherwise specified, the materials described in this section are not prior art to the claims in this disclosure and are not admitted to be prior art by inclusion in this section.

A news production system (NPS) may generate and output a video stream representing a news program. The NPS may include various components to aid in the process of generating and outputting the video stream. For example, the NPS may include a scheduling system, which may provide a user interface that allows a user (e.g., a producer or technical director) to create and/or edit a program schedule of the news program. The scheduling system may then process records in the program schedule, and based on the processed records, control one or more devices, systems, or other entities of the NPS to facilitate generating and outputting the video stream.

SUMMARY

In a first aspect, an example method involves: accessing, by a computing device, a program schedule of a news program; accessing, by the computing device, data associated with an election; using, by the computing device, the accessed data to make a determination that a status of the election satisfies each condition in a condition set; responsive to making the determination that the status of the election satisfies each condition in the condition set, modifying, by the computing device, the program schedule at least by inserting into the program schedule a record that corresponds to the election; and displaying, by the computing device, the modified program schedule.

In a second aspect, an example non-transitory computer-readable medium has stored thereon, program instructions that when executed by a processor, cause the computing device to perform a set of acts including: accessing a program schedule of a news program; accessing data associated with an election; using the accessed data to make a determination that a status of the election satisfies each condition in a condition set; responsive to making the determination that the status of the election satisfies each condition in the condition set, modifying the program schedule at least by inserting into the program schedule a record that corresponds to the election; and displaying, via the display device, the modified program schedule.

In a third aspect, an example computing device comprises a display device; a processor; and a non-transitory computer-readable medium having stored thereon, program instructions that when executed by the processor, cause the computing device to perform a set of acts comprising: accessing a program schedule of a news program; accessing data associated with an election; using the accessed data to make a determination that a status of the election satisfies each condition in a condition set; responsive to making the determination that the status of the election satisfies each condition in the condition set, modifying the program schedule at least by inserting into the program schedule a record that corresponds to the election; and displaying, via the display device, the modified program schedule.

DETAILED DESCRIPTION

I. Overview

As noted above, a scheduling system of an NPS may provide a user interface that allows a user to edit a program schedule of a news program. In some instances though, it may be challenging for the user to determine when and/or how to edit the program schedule.

For example, consider a scenario where the news program provides coverage of multiple elections (e.g., a U.S. presidential election and multiple U.S. congressional elections) and where an NPS is producing the news program on the same day as the day of those elections. In this scenario, the statuses of those elections may change frequently throughout the day (e.g., as more votes are cast and tabulated) and as such, new election-related data may become available frequently throughout the day. Given this, it may be challenging for a user to determine when and/or how to edit the program schedule to include stories about elections that may be particularly newsworthy.

The present disclosure provides an NPS that helps address this issue. In one aspect, the NPS includes an election system and a scheduling system. The election system collects and organizes various types of election-related data, such as data associated with a particular election. The scheduling system accesses and uses this data to make a determination that the status of the election satisfies each condition in a condition set, and responsively modifies a program schedule of a news program at least by inserting into the program schedule a record that corresponds to the election. The scheduling system may then display the modified program schedule for use by a user of the NPS and/or perform one or more other acts and/or functions to facilitate producing a news program that includes a story about the election.

If the status of the election satisfies each condition in the condition set, this may indicate that the election is particularly newsworthy, and thus that it may be desirable to have the news program include a story about the election. For example, if the status satisfies each condition in the condition set, this may indicate that the election is significantly close, significantly lopsided, or that an earlier projected outcome of the election was significantly inaccurate.

In some examples, the NPS may process the inserted record and perform one or more acts and/or functions to make the story a part of the news program. In one example, the NPS may do this by executing a digital video-effect (DVE).

In addition to an election system and a scheduling system, an NPS may include a DVE system, which may execute a DVE. In one example, the DVE system may receive a video stream representing a video segment, and may execute a DVE, which causes the DVE system to modify the video segment (e.g., by overlaying text, images, video, or other content thereon) and to generate a new video stream representing the modified video segment.

In a scenario where a news program provides coverage of an election, it may be desired to have the DVE system execute a DVE that causes the DVE system to generate a video stream representing a video segment that includes content relating to the election (e.g., a total number of tabulated votes for each candidate of the election). As such, the scheduling system may add to the inserted record, an instruction to execute the DVE.

In other examples, the inserted record may serve as a placeholder for a story within a news program. This may allow a user to add additional details to the record as appropriate to allow the NPS to produce a news program that includes the story. In one example, the scheduling system may use the condition set as a basis to select a DVE template from among multiple DVE templates, and may add to the inserted record, a link to the selected DVE template. This may allow a user to use a DVE template that has been tailored to the type of election sought to be added to the news program to create a DVE that the DVE system may execute. As such, the scheduling system may then use the selected template to facilitate creation of a DVE (e.g., based on input received from a user), where the created DVE is configured such that responsive to the DVE system executing the created DVE, the DVE system generates a video stream representing a video segment that includes content relating to the election.

II. Example Devices and Systems

Figure 1:
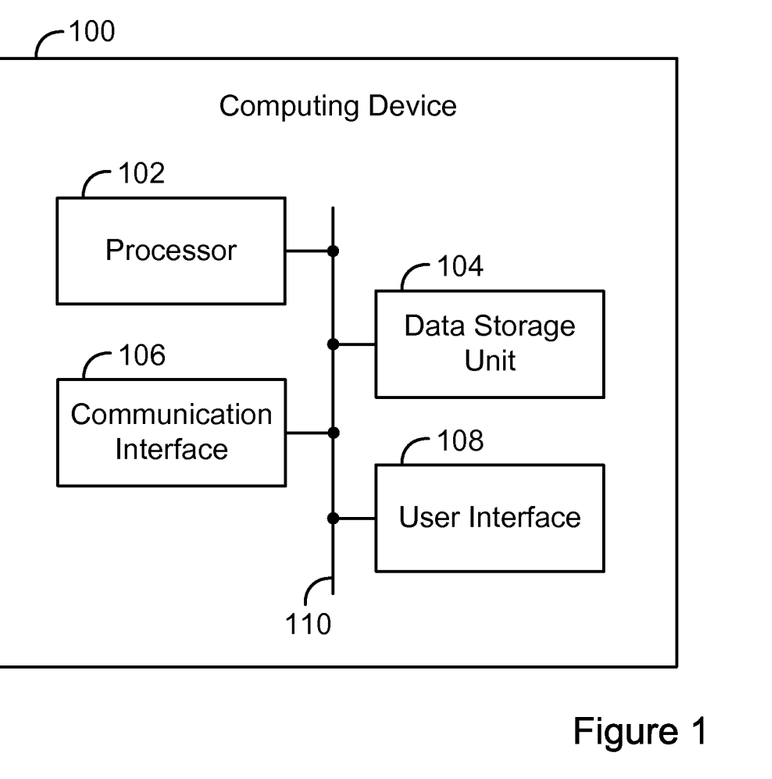
FIG. 1 is a simplified block diagram of an example computing device.

FIG. 1 is a simplified block diagram of an example computing device 100. Computing device 100 may perform various acts and/or functions, such as those described in this disclosure (including the accompanying drawings). Computing device 100 may include various components, such as processor 102, data storage unit 104, communication interface 106, and/or user interface 108. These components may be connected to each other (or to another device, system, or other entity) via connection mechanism 110.

As used in this disclosure, the term connection mechanism means a mechanism that facilitates communication between two or more devices, systems, or other entities. A communication mechanism may be a relatively simple mechanism, such as a cable or system bus, or a relatively complex mechanism, such as a packet-based communication network (e.g., the Internet). In some instances, a connection mechanism may include a non-tangible medium (e.g., where the connection is wireless).

Processor 102 may include a general-purpose processor (e.g., a microprocessor) and/or a special-purpose processor (e.g., a digital signal processor (DSP)).

Data storage unit 104 may include one or more volatile, non-volatile, removable, and/or non-removable storage components, such as magnetic, optical, or flash storage, and/or may be integrated in whole or in part with processor 102. Further, data storage unit 104 may take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 may be configured to perform one or more acts and/or functions, such as those described in this disclosure. Such program instructions may define and/or be part of a discrete software application that can be executed in response to certain inputs being received from communication interface 106 and/or user interface 108, for instance. Data storage unit 104 may also store other types of data, such as those types described in this disclosure.

Communication interface 106 may allow computing device 100 to connect to and/or communicate with a device, system, or other entity according to one or more protocols. In one example, communication interface 106 may be a wired interface, such as an Ethernet interface or a high-definition serial-digital-interface (HD-SDI). In another example, communication interface 106 may be a wireless interface, such as a cellular or WI-FI interface. Each connection described in this disclosure may be a direct connection or an indirect connection, the latter being a connection that passes through and/or traverses one or more devices, systems, or other entities, such as such as a router, switcher, or other network device.

User interface 108 may facilitate interaction with a user of computing device 100, if applicable. As such, user interface 108 may include input components such as a keyboard, a keypad, a mouse, a touch-sensitive panel, a microphone, and/or a camera, and/or output components such as a display device (which, for example, may be combined with a touch-sensitive panel), a sound speaker, and/or a haptic feedback system.

Computing device 100 may take various forms, such as a workstation, a desktop computer, a laptop, a tablet, and/or a mobile phone.

Figure 2:
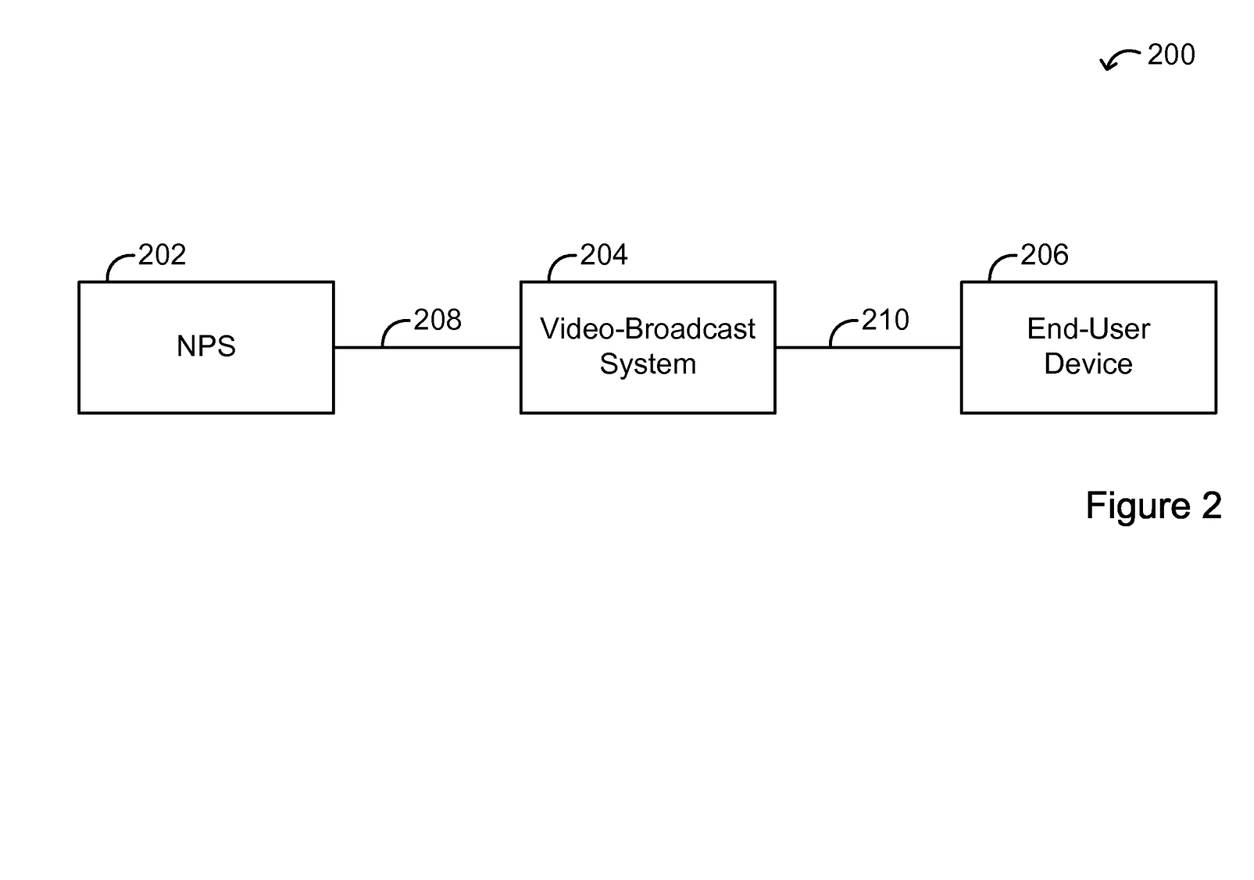
FIG. 2 is a simplified block diagram of an example system.

FIG. 2 is a simplified block diagram of an example system 200. System 200 may include various components, such as news production system (NPS) 202, video-broadcast system 204, and end-user device 206, each of which may be implemented as a computing device or a system that includes one or more computing devices. System 200 may also include connection mechanism 208, which connects NPS 202 with video-broadcast system 204; and connection mechanism 210, which connects video-broadcast system 204 with end-user device 206.

NPS 202 may generate a video stream representing a news program, and may then transmit the video stream to video-broadcast system 204. Video-broadcast system 204 may then receive the video stream and transmit the video stream to end-user device 206 for presentation of the represented video content to an end-user. In practice, video-broadcast system 204 may transmit the video stream to a large number of end-user devices for presentation of the represented video content to a large number of end-users.

A video stream may be transmitted according to a variety of different standards. For instance, a video stream may be transmitted according to the high-definition serial digital interface (HD-SDI) with a data transfer rate of 1.485 Gbps. In some instances, a video stream may be encoded and the encoded version of the video stream may be transmitted instead of the original video stream.

Figure 3:
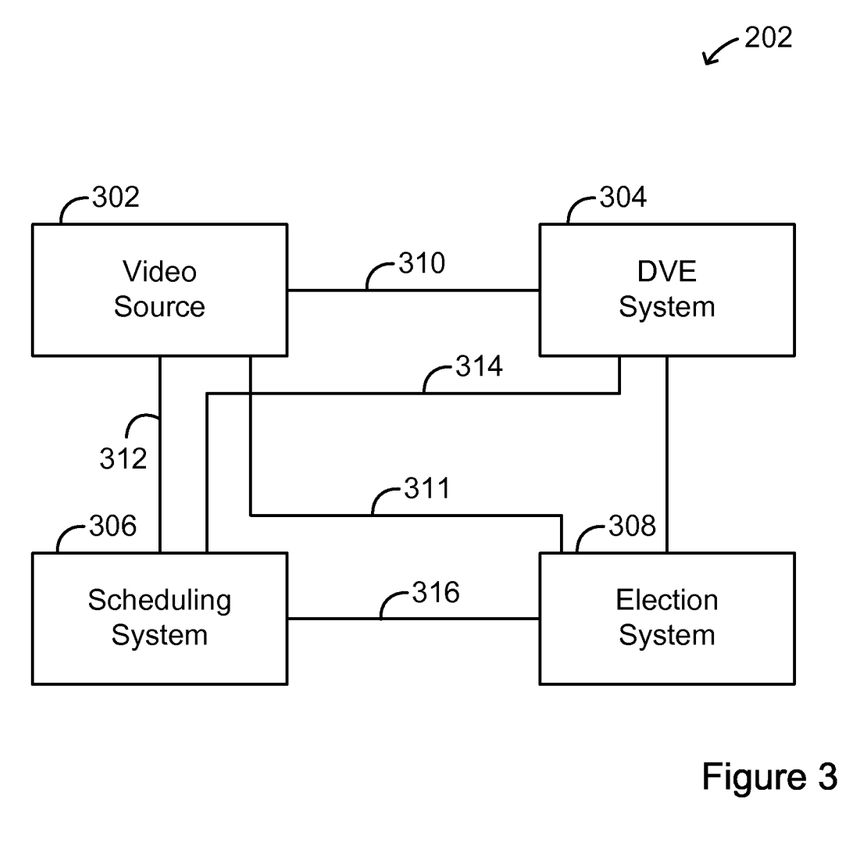
FIG. 3 is a simplified block diagram of another example system.

FIG. 3 is a simplified block diagram of an example NPS 202. NPS 202 may include various components, such as video source 302, DVE system 304, scheduling system 306, and election system 308, each of which may be implemented as computing device or a system that includes one or more computing devices. NPS 202 may also include connection mechanism 310, which connects video source 302 with DVE system 304; connection mechanism 311, which connects video source 302 with election system 308; connection mechanism 312, which connects scheduling system 306 with video source 302; connection mechanism 314, which connects scheduling system 306 with DVE system 304; and connection mechanism 316, which connects scheduling system 306 with election system 308.

Video source 302 may generate and/or output a video stream, and may transmit the video stream to DVE system 304. Video source 302 may take various forms, such as a video camera, a satellite receiver, or a video server. An example video server is the K2 server provided by Grass Valley™ of San Francisco, Calif.

DVE system 304 may execute a DVE, which may cause DVE system 304 to generate and/or output a video stream. DVE system 304 may then transmit the generated video stream to another device, system, or entity, such as video-broadcast system 204.

In one example, DVE system 304 may receive from video source 302, a video stream representing a video segment, and may execute a DVE, which causes DVE system 304 to modify the video segment and to generate and output a new video stream representing the modified video segment.

DVE system 304 may modify the video segment in various ways, such as by overlaying text, images, video, or other content thereon. For example, DVE system 304 may modify the video segment by overlaying a channel logo in a lower right-hand corner of the video segment. As another example, DVE system 304 may modify the video segment by overlaying a text box including text over a lower-third portion of the video segment. As yet another example, DVE system 304 may modify the video segment by overlaying election-related content on the video segment.

Figure 4A:
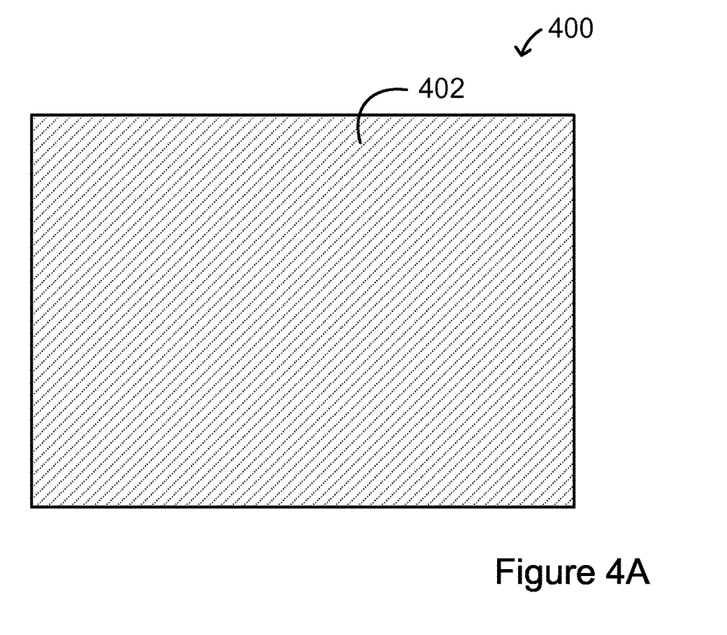
FIG. 4A is a simplified illustration of a frame of an example video segment, where no content is overlaid on the frame.
Figure 4B:
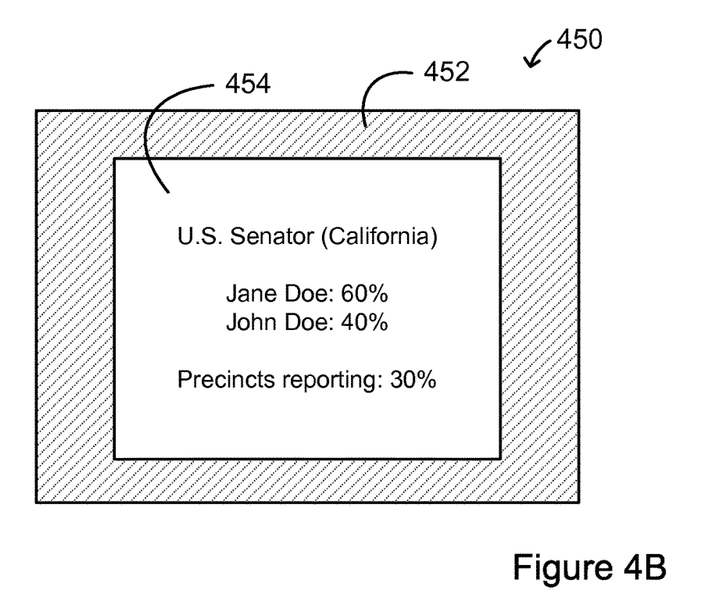
FIG. 4B is a simplified illustration of a frame of an example video segment, where content is overlaid on the frame.

FIGS. 4A and 4B help illustrate the concept of overlaying content on a video segment. FIG. 4A is a simplified diagram of a frame 400 of an example video segment. Frame 400 includes content 402, but does not include content overlaid on content 402. For comparison, FIG. 4B is a simplified diagram of a frame 450 of an example video segment. Frame 452 includes content 452 and content 454 overlaid on content 452. Content 454 is content related to an election, namely one for a U.S. Senator representing California. Content 454 indicates vote total percentages of 60% and 40% for two candidates, Jane Doe and John Doe, respectively, and further indicates that 30% of precincts are reporting.

As noted above, DVE system 304 may execute a DVE, which causes DVE system 304 to generate a video stream by modifying a video segment represented by an existing video stream. However, as another example, DVE system 304 may execute a DVE, which causes DVE system 304 to generate a video stream without using an existing video stream. In this case, rather than overlaying content on an existing video segment, DVE system 304 may instead generate a new video segment, and may generate a video stream representing the generated video segment.

DVE system 304 may obtain content for use in connection with executing a DVE in various ways. For example, DVE system 304 may retrieve such content from a data storage unit in the DVE system. As another example, DVE system 304 may receive such content from another source, such as video source 302 or election system 308.

In practice, DVE system 304 may execute multiple DVEs in serial fashion. Further, in practice, NPS 202 may include multiple video sources and/or multiple DVE systems. For example, in one arrangement, each of multiple video sources may be connected to DVE system 304, and DVE system 304 may switch between one or more inputs as appropriate to execute a given DVE.

DVE system 304 may also perform other acts/or functions related to DVEs. For example, DVE system 304 may provide a user interface that allows a user to create and/or edit DVEs. When DVE system 304 creates a DVE, DVE system 304 may generate and store corresponding program instructions for later retrieval and execution. As such, the process of the DVE system 304 executing a DVE may involve DVE system retrieving and executing program instructions corresponding to the DVE.

DVE system 304 may take various forms, such as a production switcher. An example production switcher is the Vision Octane production switcher provided by Ross Video Ltd. of Iroquois, Ontario in Canada.

Scheduling system 306 may perform acts and/or functions related to scheduling and managing the production of a news program. For example, scheduling system 306 may provide a user interface that allows a user to create and/or edit a program schedule of a news program. Further, scheduling system 306 may process records in a program schedule. This may result in scheduling system 306 controlling one or more other devices, systems, or entities of the NPS 202 to cause NPS 202 to generate and/or output a video stream representing a news program. As such, based on a program schedule, scheduling system 306 may control video source 302 and DVE system 304.

A program schedule (sometimes referred to in the industry as a "rundown") serves as an outline of a news program and may include multiple records. A news program may be conceptually divided into multiple logically-separated portions (sometimes referred to in the industry as "stories"). As such, each portion of the news program may be represented by a separate record of the program schedule. Each record may include various types of information.

Figure 5A:
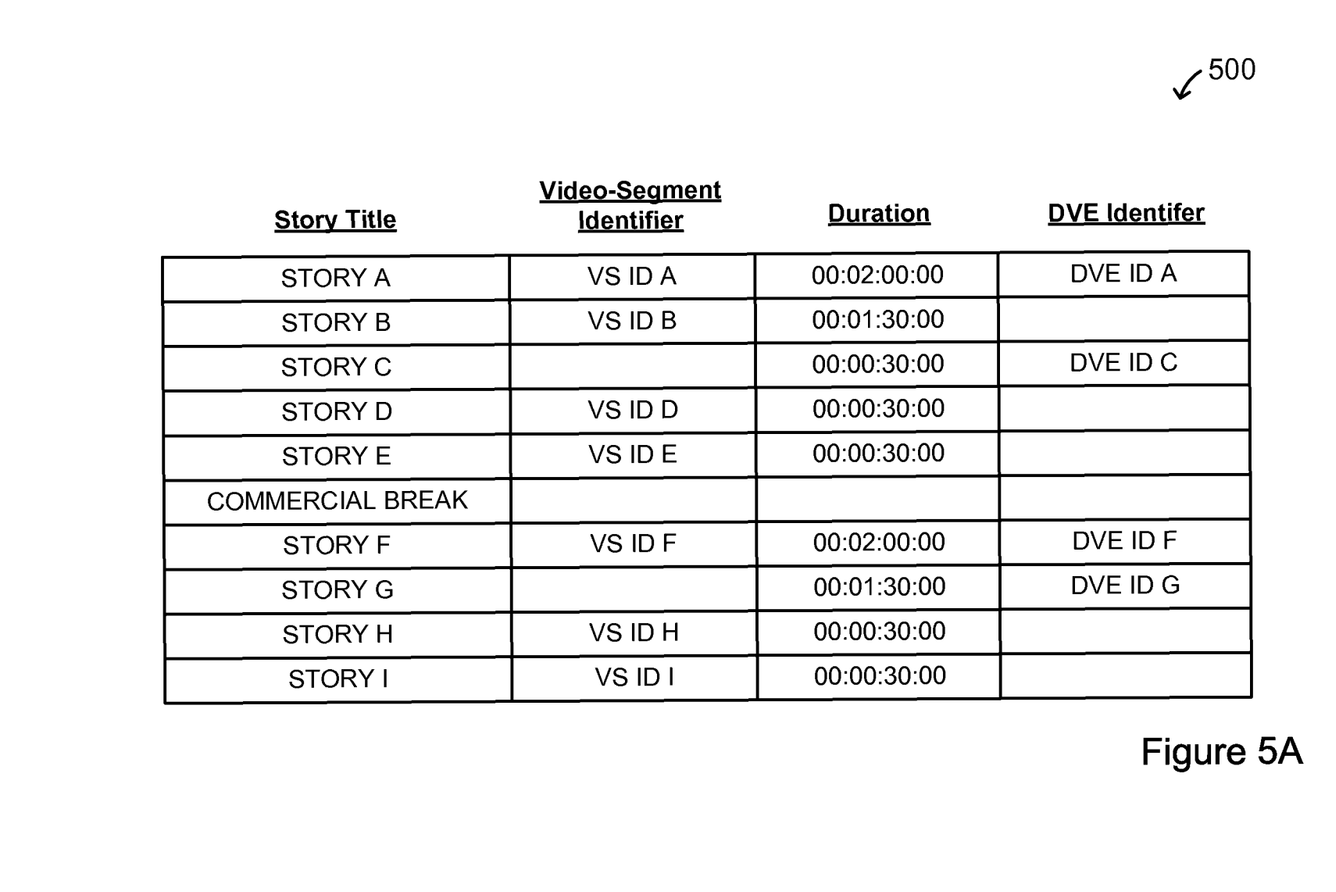
FIG. 5A is a simplified illustration of an example program schedule in a first state.
Figure 5B:
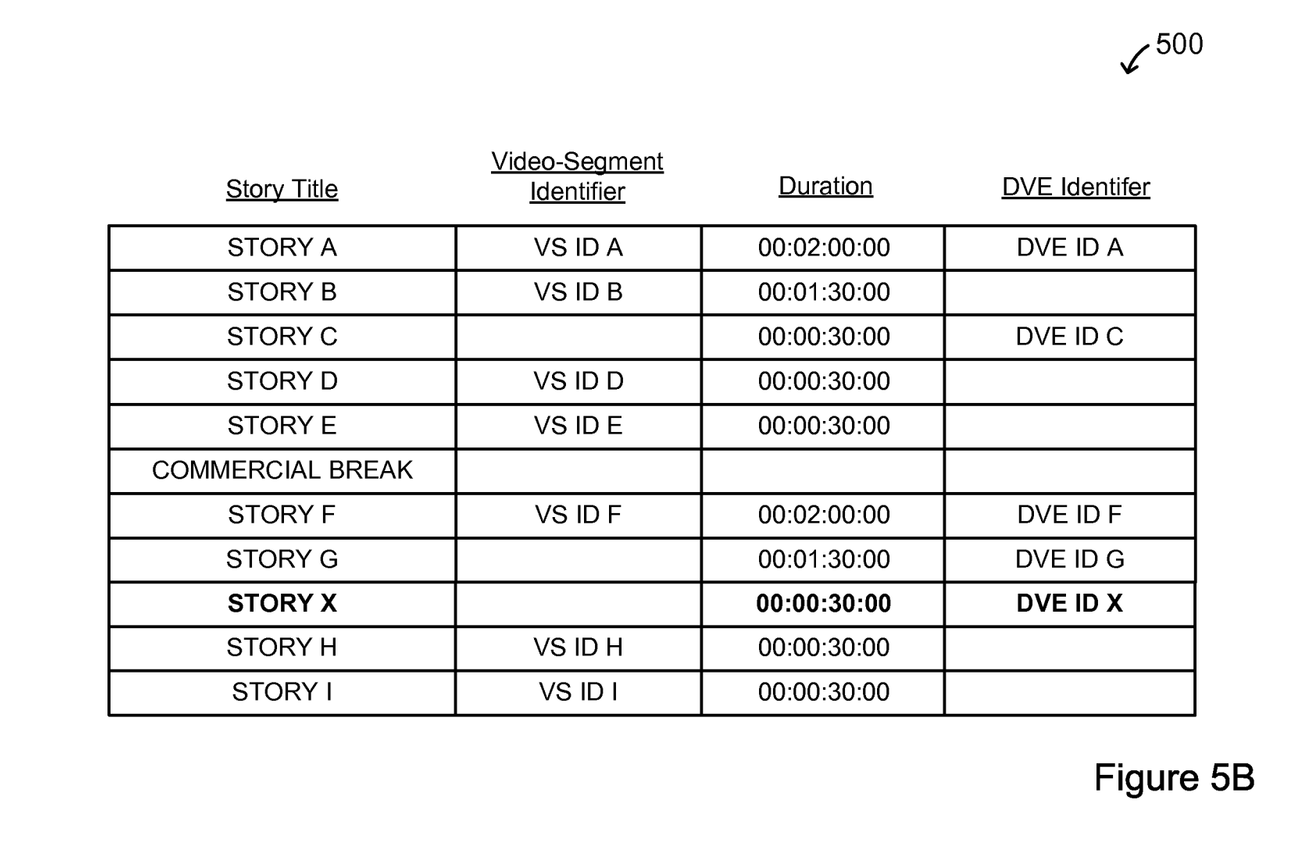
FIG. 5B is a simplified illustration of the example program schedule of FIG. 5A, but in a second state.

FIG. 5A is a simplified diagram of an example program schedule 500 in a first state. FIG. 5B is a simplified diagram of program schedule 500 in a second state and is discussed later in this disclosure. Referring to FIG. 5A, program schedule 500 includes 10 records, represented as 10 ordered rows. Each record corresponds to a respective portion of a news program, except for one which corresponds to a commercial break. For each portion, the respective record specifies at least one of a story title, a video-segment identifier, a duration, and a DVE identifier (which may serve as an instruction to execute the identified DVE).

For example, the first record specifies a story title of STORY A, a video-segment identifier of VS ID A, a duration of 00:02:00:00 (in hours::minutes::seconds::frames format), and a DVE identifier of DVE ID A. As such, upon scheduling system 306 processing the first record, scheduling system 306 may cause video source 302 to playout a video segment identified by the identifier video-segment identifier VS ID A for two minutes, and further may cause DVE system 304 to execute a DVE identified by the DVE identifier DVE ID A, which for example, may cause DVE system 304 to overlay content on the video segment.

As another example, the third record specifies a story title of STORY C, a duration of 00:00:30:00, and a DVE identifier of DVE ID C. As such, upon scheduling system 306 processing the third record, scheduling system 306 may cause DVE system 304 to execute a DVE identified by the DVE identifier DVE ID C, which for example, may cause DVE system 304 to generate and output, for two minutes, a video stream representing video content.

It should be noted that program schedule 500 has been greatly simplified for the purposes of illustrating certain features. In practice, a program schedule is likely to include significantly more data such as further details with regarding to DVE execution timing.

Election system 308 may facilitate the process of gathering, organizing, and outputting election-related data. Such data may come from various sources, such as from government-operated reporting systems, and may take various forms. Such data may indicate various types of information about elections, such as titles of political offices that are the subject of the elections, names and other information of candidates, amounts of votes cast and/or tabulated for candidates, amounts and identifies of precincts or other zones reporting tabulated votes, and/or projections of election outcomes.

In this disclosure, the terms "election" means any type of vote-based decision-making process. In one example, an election may involve a process where voters vote to determine which candidate obtains a political office. In another example, an election may involve a ballot-initiative process where voters vote to determine whether or not a proposed law becomes law. As such, an election may have various types of voting options.

Video-broadcast system 204 may distribute a video stream to an end-user device for presentation of video content represented by the video stream to an end-user. In practice, video-broadcast system 204 may distribute a video stream to a mass number of end-user devices for presentation of video content represented by the video stream to a mass number of end-users. Video-broadcast system 204 may include various systems or components, such as a terrestrial antenna or a satellite, and may be configured for distributing the video stream to end-user device 206 in various ways. For example, video-broadcast system 204 may distribute the video stream over-the-air or via a packet-based network such as the Internet.

End-user device 206 may present video content represented by a received video stream to an end-user. End-user device 26 may take a variety of forms, such as a television, a television set-top box, and/or a computing device. As used throughout this disclosure, the term video-broadcast means the distribution of video via any means.

In some examples, in addition to generating and outputting a video stream representing video content, NPS 202 may generate and output an audio stream representing corresponding audio content. Similarly, in some examples, a video-broadcast system may be integrated with an audio-broadcast system, such that a video stream representing video content may be broadcast together with an audio stream representing corresponding audio content. Likewise, in some examples, in addition to presenting video content represented by a video stream, end-user device 206 may present corresponding audio content represented by a received audio stream. In any of these examples, a video stream and an audio stream may be combined into a single media stream.

III. Example Operations

In one aspect, scheduling system 306 may perform various acts, which will now be described. First, scheduling system 306 may access program schedule 500, such as from a data storage unit of scheduling system 306. Next, scheduling system 306 may access data associated with an election, such as by receiving such data from election system 308.

Next, scheduling system 306 may use the accessed data to make a determination that a status of the election satisfies each condition in a condition set. If the status of the election satisfies each condition in the condition set, this may indicate that the election is particularly newsworthy, and thus that it may be desirable to have a news program include a story about the election.

The condition set may include one or more conditions. In a first example, the condition set may include a condition that at least a threshold amount of votes cast in connection with the election have been tabulated. In some instances, if this condition is satisfied, this may indicate that there are a significant amount of votes that have been tabulated.

In a second example, the condition set may include a condition that a difference between an amount of votes tabulated for a first candidate of the election and an amount of votes tabulated for a second candidate of the election is at most a threshold amount. In some instances, if this condition is satisfied, this may indicate that the election is significantly close.

In a third example, the condition set may include a condition that a difference between an amount of votes tabulated for a first candidate of the election and an amount of votes tabulated for a second candidate of the election is at least a threshold amount. In some instances, if this condition is satisfied, this may indicate that the election is significantly lopsided.

In a fourth example, the condition set may include a condition that a first projected outcome of the election and a second projected outcome of the election differ by at least a threshold extent, where the first projected outcome of the election is determined before the second projected outcome of the election is determined. In some instances, if this condition is satisfied, this may indicate that an earlier projection of the outcome of the election was significantly inaccurate. The condition set may include any of these or other conditions in any combination.

In a fifth example, the condition set may include a condition that voter-turnout associated with the election is at least a threshold amount. In one example, scheduling system 306 may determine a voter-turnout amount by comparing an amount of voters registered in a given geographic area (e.g., covering one or more precincts associated with the election) with a corresponding amount of votes tabulated. In some instances, if this condition is satisfied, this may indicate that the election has significantly high voter turnout.

In a sixth example, the condition set may include a condition that voter turnout associated with the election is at most a threshold amount. In some instances, if this condition is satisfied, this may indicate that the election has significantly low voter turnout.

In a seventh example, the condition set may include a condition that the election is a subject of a threshold extent of social-media activity. In one example, the threshold extent of social-media activity may be a threshold amount of social-media activity. In one implementation, scheduling system 306 may determine an amount of social media-activity by querying a social media database (e.g., a database of Twitter or Facebook postings) and determining how many postings include a term related to the election, perhaps during a specified time period. In another example, the threshold extent of social-media activity may be a threshold change in social-media activity. In one implementation, scheduling system 306 may determine a change in social-media activity by comparing amounts of social-media activity across multiple time periods. In some instances, scheduling system 306 may compare activity in one election with activity in other elections to determine whether the activity of that election breaks from a trend of the others. In some instances, if this condition is satisfied, this may indicate that public interest in the election is relatively high.

Next, responsive to scheduling system 306 making the determination that the status of the election satisfies each condition in the condition set, scheduling system 306 may modify program schedule 500 at least by inserting into the program schedule a record that corresponds to the election. In one example, scheduling system 306 may insert a record into program schedule 500 by replacing one record of program scheduling 500 with another record.

As noted above, FIG. 5B is a simplified diagram of program schedule 500 in a second state. This second state reflects a state after the insertion process. As shown in FIG. 5B (in bold text), program schedule 500 includes an additional record that corresponds to an additional portion of the represented news program. The inserted record specifies a story title of STORY X, a duration value of 00:00:30:00, and a DVE identifier of DVE ID X. As such, upon scheduling system 306 processing this record, scheduling system 306 may cause DVE system 304 to execute a DVE identified by the DVE identifier DVE ID X, which causes DVE system 304 to generate a video stream representing a video segment that includes content related to the election. Such content may include, for instance, content 454 as shown in FIG. 4B.

In some instances, scheduling system 306 may determine an insertion position of program schedule 500, in which case the act of scheduling system 306 inserting into program schedule 500 the record that corresponds to the election may include scheduling system 306 inserting into program schedule 500, at the determined insertion position, the record that corresponds to the election.

In some instances, scheduling system 306 determining the insertion position of the program schedule may include scheduling system using the determined condition set as a basis to determine the insertion position of the program schedule (e.g., based on a mapping table). In one example, this may allow for scheduling system 306 to add, early in the news program, a story about a election that is significantly newsworthy. On the other hand, this may allow for scheduling system 306 to add, late in the news program, a story about a election that is not significantly newsworthy.

In some instances, scheduling system 306 may add to the inserted record, an instruction to execute a DVE, where the DVE is configured such that responsive to DVE system 304 executing the DVE, DVE system 304 generates a video stream representing a video segment that includes content related to the election. In some instances, a DVE identifier may serve as such an instruction.

Scheduling system 306 may display the modified program schedule for use by a user (e.g., a producer or technical director) in connection with producing the news program.

In some examples, the inserted record may serve as a placeholder for a story within a news program. This may allow a user to add additional details to the record as appropriate to allow NPS 202 to produce a news program that includes the story. In another example, scheduling system 308 may replace the placeholder with a story about a particular election, perhaps based on data associated with that election satisfying one or more conditions.

In some examples, scheduling system 306 may use the condition set as a basis to select a DVE template from among multiple DVE templates, and scheduling system 306 may add to the inserted record, a link to the selected DVE template. Scheduling system 306 may then use the selected template to facilitate creation of a DVE, where the created DVE is configured such that responsive to DVE system 304 executing the created DVE, DVE system 304 generates a video stream representing a video segment that includes content related to the election. Scheduling system 306 may then add to the inserted record, an instruction to execute the created DVE.

This may allow a user to use a DVE template that has been tailored to the election sought to be added to the news program to create a DVE that DVE system 304 may execute. As such, scheduling system 306 may then use the selected template to facilitate creation of a DVE (e.g., based on input from a user), where the created DVE is configured such that responsive to DVE system 304 executing the created DVE, DVE system 304 generates a video stream representing a video segment that includes content relating to the election.

Figure 6:
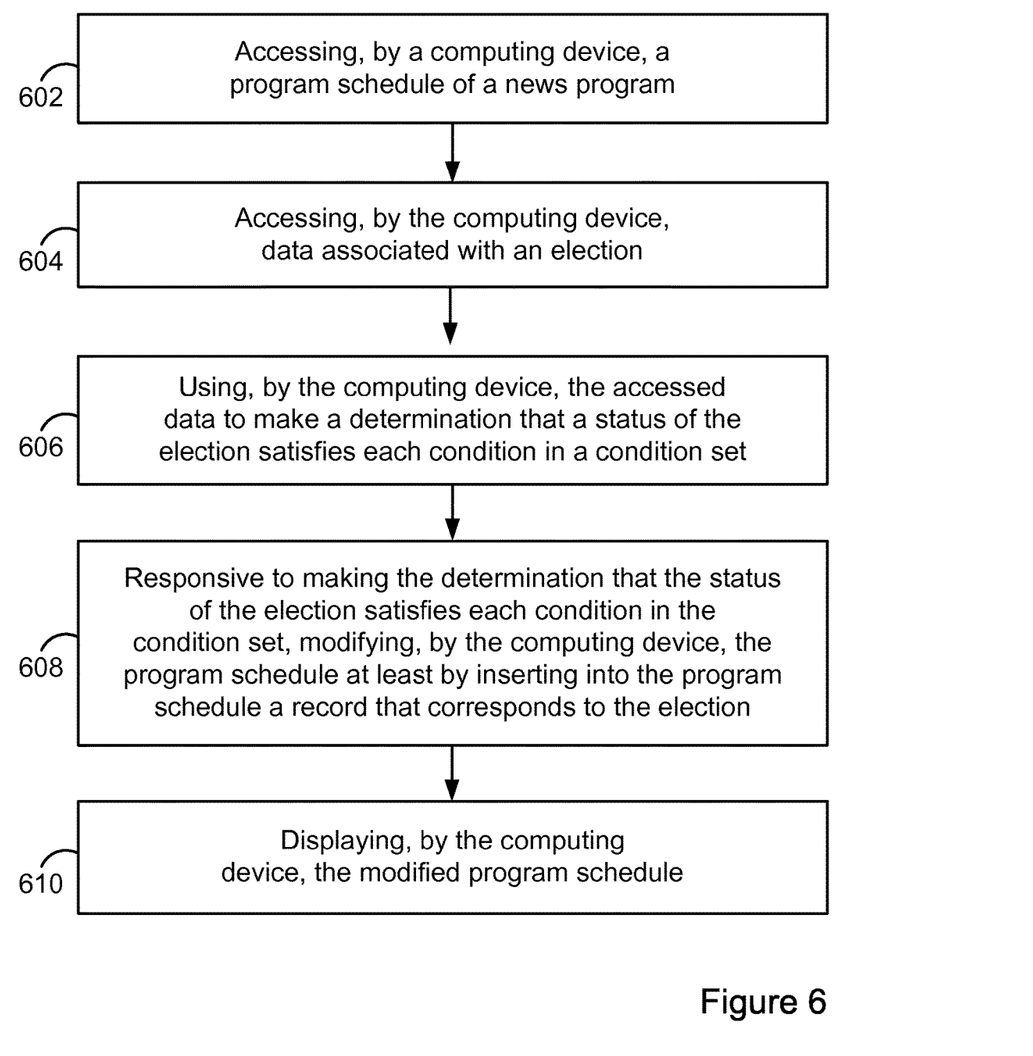
FIG. 6 is a flow chart illustrating an example method.

FIG. 6 is a flow chart illustrating an example method 600. At block 602, method 600 may include accessing, by a computing device, a program schedule of a news program.

At block 604, method 600 may include accessing, by the computing device, data associated with an election.

At block 606, method 600 may include using, by the computing device, the accessed data to make a determination that a status of the election satisfies each condition in a condition set.

At block 608, method 600 may include responsive to making the determination that the status of the election satisfies each condition in the condition set, modifying, by the computing device, the program schedule at least by inserting into the program schedule a record that corresponds to the election.

At block 610, method 600 may include displaying, by the computing device, the modified program schedule.

IV. Example Variations

Each of the systems, devices, or other entities described in this disclosure may or may not be a discrete entity. As such, each of the described entities may be made up of multiple discrete entities. Further, two or more of the described entities may be combined into a single discrete entity.

Although some of the acts and/or functions described in this disclosure have been described as being performed by a particular entity (e.g., scheduling system 306), such acts and/or functions may be performed by any entity, such as those described in this disclosure (e.g., election system 308). Further, although the described acts and/or functions have been recited in a particular order, the acts and/or functions need not be performed in the order recited. However, in some instances, it may be desired to perform the acts and/or functions in the order recited. Also, not all of the described acts and/or functions need to be performed to achieve one or more of the benefits provided by this disclosure, and therefore not all acts and/or functions are required.

Although certain variations have been discussed in connection with one or more example of this disclosure, such variations may also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
accessing, by a computing device, a program schedule of a news program, wherein the program schedule comprises a plurality of records, each record of the plurality of records corresponding to a respective story of the news program;
accessing, by the computing device, data associated with an election;
using, by the computing device, the accessed data to make a determination that a status of the election satisfies each condition in a condition set;
responsive to making the determination that the status of the election satisfies each condition in the condition set, modifying, by the computing device, the program schedule at least by adding to the plurality of records of the program schedule an additional record that corresponds to an additional story of the news program, wherein the additional story of the news program includes content associated with the election;
using, by the computing device, the condition set as a basis to select a digital video effect (DVE) template from among multiple DVE templates;
using, by the computing device, the selected template to facilitate creation of a DVE, wherein the created DVE is configured such that, responsive to a DVE system executing the created DVE, the DVE system generates a video stream representing a video segment that includes content related to the election; and
adding, by the computing device, to the additional record, an instruction to execute the created DVE.

2. The method of claim 1, wherein the condition set comprises at least one condition from the group consisting of:
a first condition that at least a threshold amount of votes cast in connection with the election have been tabulated;
a second condition that a difference between an amount of votes tabulated for a first candidate of the election and an amount of votes tabulated for a second candidate of the election is at most a threshold amount;
a third condition that a difference between an amount of votes tabulated for a first candidate of the election and an amount of votes tabulated for a second candidate of the election is at least a threshold amount;
a fourth condition that a first projected outcome of the election and a second projected outcome of the election differ by at least a threshold extent, wherein the first projected outcome of the election is determined before the second projected outcome of the election is determined;
a fifth condition that voter-turnout associated with the election is at least a threshold amount;
a sixth condition that voter turnout associated with the election is at most a threshold amount; and
a seventh condition that the election is a subject of a threshold extent of social-media activity.

3. The method of claim 1, further comprising:
determining, by the computing device, an insertion position of the program schedule, wherein adding to the plurality of records of the program schedule the additional record that corresponds to the additional story of the news program comprises inserting into the program schedule, at the determined insertion position, the additional record that corresponds to the additional story of the news program.

4. The method of claim 3, wherein determining the insertion position of the program schedule comprises using the condition set as a basis to determine the insertion position of the program schedule.

5. The method of claim 1, further comprising:
based on the added instruction, executing, by the computing device, the DVE, thereby causing the DVE system to generate the video stream.

6. The method of claim 5, further comprising:
transmitting, by the computing device, the generated video stream to an end-user device for presentation of the represented video segment to an end-user.

7. The method of claim 1, further comprising:
adding, by the computing device, to the additional record, a link to the selected DVE template.

8. A non-transitory computer-readable medium having stored thereon program instructions that, when executed by a processor, cause a computing device to perform a set of acts comprising:
accessing a program schedule of a news program, wherein the program schedule comprises a plurality of records, each record of the plurality of records corresponding to a respective story of the news program;
accessing data associated with an election;
using the accessed data to make a determination that a status of the election satisfies each condition in a condition set;
responsive to making the determination that the status of the election satisfies each condition in the condition set, modifying the program schedule at least by adding to the plurality of records of the program schedule an additional record that corresponds to an additional story of the news program, wherein the additional story of the news program includes content associated with the election;
using the condition set as a basis to select a DVE template from among multiple DVE templates;
using the selected template to facilitate creation of a DVE, wherein the created DVE is configured such that, responsive to a DVE system executing the created DVE, the DVE system generates a video stream representing a video segment that includes content related to the election; and
adding, to the additional record, an instruction to execute the created DVE.

9. The non-transitory computer-readable medium of claim 8, wherein the condition set comprises at least one condition from the group consisting of:
a first condition that at least a threshold amount of votes cast in connection with the election have been tabulated;
a second condition that a difference between an amount of votes tabulated for a first candidate of the election and an amount of votes tabulated for a second candidate of the election is at most a threshold amount;
a third condition that a difference between an amount of votes tabulated for a first candidate of the election and an amount of votes tabulated for a second candidate of the election is at least a threshold amount;
a fourth condition that a first projected outcome of the election and a second projected outcome of the election differ by at least a threshold extent, wherein the first projected outcome of the election is determined before the second projected outcome of the election is determined;
a fifth condition that voter-turnout associated with the election is at least a threshold amount;
a sixth condition that voter turnout associated with the election is at most a threshold amount; and
a seventh condition that the election is a subject of a threshold extent of social-media activity.

10. The non-transitory computer-readable medium of claim 8, the set of acts further comprising:
determining an insertion position of the program schedule, wherein adding to the plurality of records of the program schedule the additional record that corresponds to the additional story of the news program comprises inserting into the program schedule, at the determined insertion position, the additional record that corresponds to the additional story of the news program.

11. The non-transitory computer-readable medium of claim 10, wherein determining the insertion position of the program schedule comprises using the condition set as a basis to determine the insertion position of the program schedule.

12. The non-transitory computer-readable medium of claim 8, the set of acts further comprising:
based on the added instruction, executing the DVE, thereby causing the DVE system to generate the video stream.

13. The non-transitory computer-readable medium of claim 12, the set of acts further comprising:
transmitting the generated video stream to an end-user device for presentation of the represented video segment to an end-user.

14. The non-transitory computer-readable medium of claim 8, the set of acts further comprising:
adding to the additional record, a link to the selected DVE template.

15. A computing device comprising:
a display device;
a processor; and
a non-transitory computer-readable medium having stored thereon program instructions that, when executed by the processor, cause the computing device to perform a set of acts comprising:
accessing a program schedule of a news program, wherein the program schedule comprises a plurality of records, each record of the plurality of records corresponding to a respective story of the news program;
accessing data associated with an election;
using the accessed data to make a determination that a status of the election satisfies each condition in a condition set;
responsive to making the determination that the status of the election satisfies each condition in the condition set, modifying the program schedule at least by adding to the plurality of records of the program schedule an additional record that corresponds to an additional story of the news program, wherein the additional story of the news program includes content associated with the election;
using the condition set as a basis to select a DVE template from among multiple DVE templates;
using the selected template to facilitate creation of a DVE, wherein the created DVE is configured such that, responsive to a DVE system executing the created DVE, the DVE system generates a video stream representing a video segment that includes content related to the election; and
adding, to the additional record, an instruction to execute the created DVE.

16. The computing device of claim 15, wherein the condition set comprises at least one condition from the group consisting of:
a first condition that at least a threshold amount of votes cast in connection with the election have been tabulated;
a second condition that a difference between an amount of votes tabulated for a first candidate of the election and an amount of votes tabulated for a second candidate of the election is at most a threshold amount;
a third condition that a difference between an amount of votes tabulated for a first candidate of the election and an amount of votes tabulated for a second candidate of the election is at least a threshold amount;
a fourth condition that a first projected outcome of the election and a second projected outcome of the election differ by at least a threshold extent, wherein the first projected outcome of the election is determined before the second projected outcome of the election is determined;
a fifth condition that voter-turnout associated with the election is at least a threshold amount;
a sixth condition that voter turnout associated with the election is at most a threshold amount; and
a seventh condition that the election is a subject of a threshold extent of social-media activity.

17. The computing device of claim 15, the set of acts further comprising:
determining an insertion position of the program schedule, wherein adding to the plurality of records of the program schedule the additional record that corresponds to the additional story of the news program comprises inserting into the program schedule, at the determined insertion position, the additional record that corresponds to the additional story of the news program.

18. The computing device of claim 17, wherein determining the insertion position of the program schedule comprises using the condition set as a basis to determine the insertion position of the program schedule.

19. The computing device of claim 15, the set of acts further comprising:
adding to the additional record, a link to the selected DVE template.

20. The computing device of claim 15, the set of acts further comprising:
based on the added instruction, executing the DVE, thereby causing the DVE system to generate the video stream; and
transmitting the generated video stream to an end-user device for presentation of the represented video segment to an end-user.

* * * * *